(12) United States Patent
Porta

(10) Patent No.: US 10,757,238 B1
(45) Date of Patent: Aug. 25, 2020

(54) CELL PHONE ATTACHMENT

(71) Applicant: Scott S. Porta, New Smyrna Beach, FL (US)

(72) Inventor: Scott S. Porta, New Smyrna Beach, FL (US)

( * ) Notice: Subject to any disclaimer, the term of this patent is extended or adjusted under 35 U.S.C. 154(b) by 0 days.

(21) Appl. No.: 16/540,771

(22) Filed: Aug. 14, 2019

(51) Int. Cl.
*H04M 1/00* (2006.01)
*H04M 1/18* (2006.01)

(52) U.S. Cl.
CPC ................................ *H04M 1/18* (2013.01)

(58) Field of Classification Search
CPC ............................................. H04M 1/18
USPC .................................. 455/575.8, 575.9
See application file for complete search history.

(56) References Cited

U.S. PATENT DOCUMENTS

| | | | |
|---|---|---|---|
| 5,333,656 A * | 8/1994 | Mackal | B63C 9/24 141/19 |
| 5,694,986 A * | 12/1997 | Weinheimer | B63C 9/24 141/19 |
| 6,558,082 B1 * | 5/2003 | Courtney | B63C 9/1055 116/26 |
| 6,842,633 B1 * | 1/2005 | Deo | H04M 1/0252 379/433.01 |
| 7,018,257 B2 * | 3/2006 | Courtney | B63C 9/24 222/5 |
| 7,056,179 B2 * | 6/2006 | Courtney | B63C 9/0005 441/90 |
| 7,093,742 B2 * | 8/2006 | Steven, III | A45F 5/02 224/197 |
| 7,819,714 B2 | 10/2010 | Medford et al. | |
| 8,295,896 B2 * | 10/2012 | Jeon | A45C 11/00 396/27 |
| 9,876,522 B2 * | 1/2018 | Huang | H04B 1/3888 |
| 2009/0098784 A1 * | 4/2009 | Medford | B63C 9/24 441/95 |
| 2009/0301601 A1 * | 12/2009 | Enerson | C06D 5/06 141/38 |
| 2015/0045012 A1 * | 2/2015 | Siminou | A61B 3/11 455/419 |
| 2015/0289052 A1 * | 10/2015 | Takeda | H04R 1/06 381/151 |
| 2016/0234356 A1 * | 8/2016 | Thomas | H05K 9/0069 |
| 2018/0014172 A1 * | 1/2018 | Baldree | G08B 21/0213 |
| 2018/0115638 A1 | 4/2018 | Bower et al. | |
| 2019/0297485 A1 * | 9/2019 | Baldree | G08B 13/1427 |

* cited by examiner

*Primary Examiner* — Marceau Milord
(74) *Attorney, Agent, or Firm* — William M. Hobby, III

(57) ABSTRACT

A mobile phone attachment allows a mobile phone to be recovered if dropped in water by inflating an air bag in the attachment whenever the mobile phone is dropped in water.

18 Claims, 3 Drawing Sheets

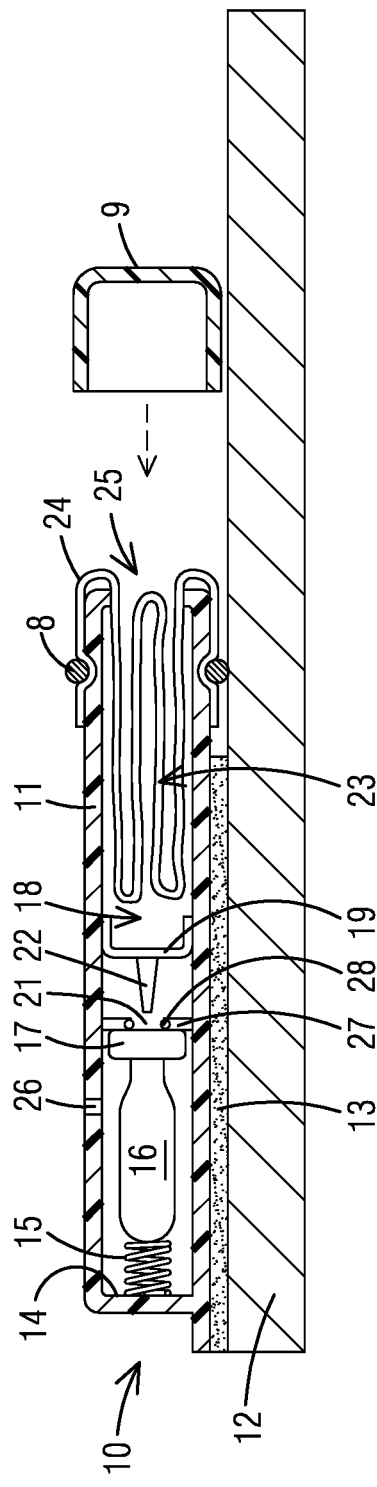
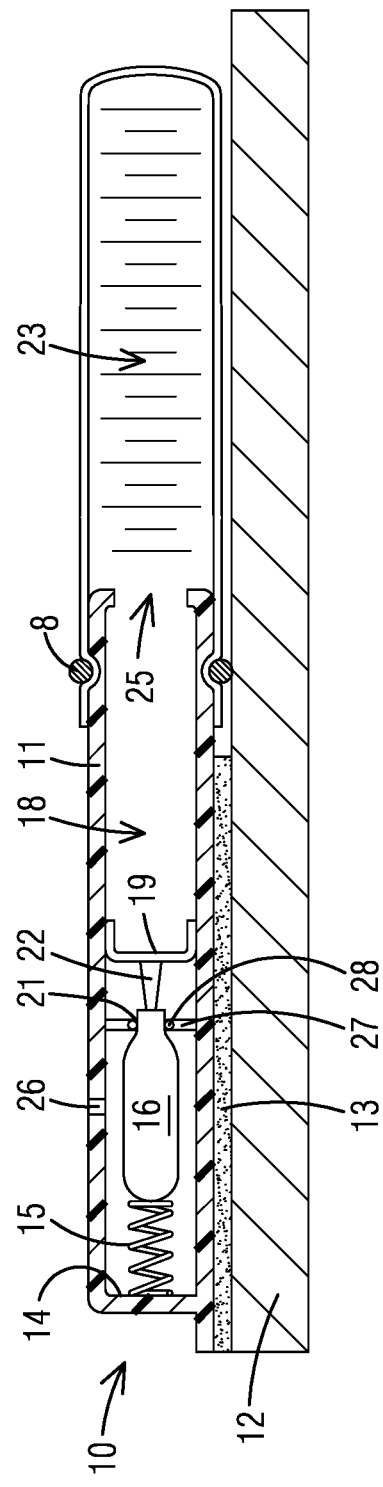

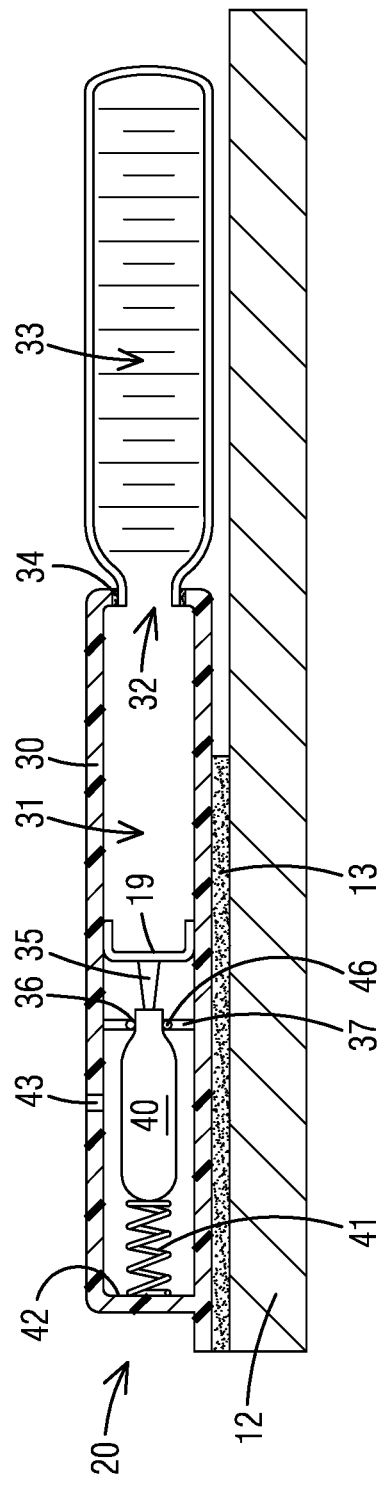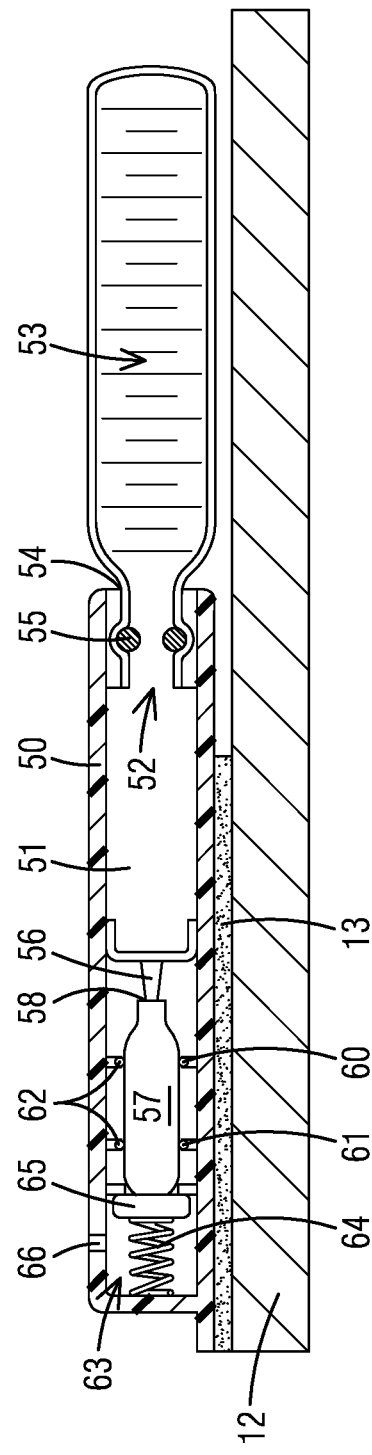

CELL PHONE ATTACHMENT

FIELD OF THE INVENTION

This invention relates to a mobile phone attachment which allows the mobile phone to be recovered if dropped in water.

BACKGROUND OF THE INVENTION

In the past when a mobile phone was dropped in water, such as the ocean or a lake, it would sink and be lost forever. Many phones are made waterproof so that if they can be recovered they can continue to be used. Also it has been suggested to provide a waterproof cover to fit over a mobile phone to protect it from water.

The present invention provides an attachment for an existing mobile phone that allows it to be recovered in the event it is dropped in the ocean or in a lake or the like.

Prior art includes the Bower et al. U.S. Patent Application Publication No. US 2018/0115638 for a floatable structure which is attached to a mobile electronic device when used near water where it might sink. The floatable structure is shaped to be the size of the mobile device and adds floatation to the device. The floatation material may be of a low density foam or air or gas and attached to the mobile electronic device with glue or VELCRO. The floatation material will then float the mobile device if dropped in water.

The Medford et al U.S. Pat. No. 7,819,714 is for a water activated inflator for use in air deployable rafts or the like dropped from aircraft, such as life rafts dropped to survivors in a body of water. Auto inflation of life vests and the like are also known in the art which use a water soluble element for holding a membrane piercing mechanism in a cocked position.

The present invention is for a mobile phone attachment which allows the mobile phone to be recovered if dropped in water which is activated by the water when dropped.

SUMMARY OF THE INVENTION

This invention relates a mobile phone attachment which inflates a flotation air bag when the mobile phone is dropped into water. The attachment has an elongated housing having a closed end and is attachable to a mobile phone or the like. A biasing member, such as a coil spring, is positioned in the closed end of the housing behind a compressed gas cylinder which gas cylinder is biased against a water soluble tablet, such as a salt tablet, which tablet is positioned and held in position by a ledge in the housing which ledge has a center opening having a seal, such as an o-ring. An air bag chamber is located in the housing in front of the water soluble tablet and holds a deflated air bag therein. A pointed punch is positioned in the housing air bag chamber adjacent the ledge center aperture and water soluble tablet resting thereon. The punch is positioned for the compressed gas cylinder to be driven thereagainst when the water soluble tablet dissolves in water to allow the compressed gas to be pushed forward into the ledge aperture and to be penetrated by the pointed punch. This releases the compressed gas in the compressed gas cylinder into the air bag chamber inflate and drive the deflated air bag from the housing air bag chamber with the compressed gas from the compressed gas cylinder. This inflates the air bag when the mobile phone attachment is dropped in water and dissolves the water soluble tablet to float the attached mobile phone.

BRIEF DESCRIPTION OF THE DRAWINGS

The accompanying drawings, which are included to provide further understanding of the invention, are incorporated in and constitute a part of the specification and illustrate an embodiment of the invention and together with the description serve to explain the principles of the invention.

In the drawings:

FIG. 3 is a sectional view of a mobile phone and mobile phone attachment of FIGS. 1 and 2 prior to the flotation air bag being actuated;

FIG. 4 is a sectional view of a mobile phone and mobile phone attachment of FIGS. 1-3 with the flotation air bag expanded; and FIG. 5 is a sectional view of an alternate embodiment of a mobile phone attachment.

FIG. 6 is a sectional view of another alternate embodiment of a mobile phone attachment.

DETAILED DESCRIPTION OF AN EXEMPLARY EMBODIMENT

Figure 1:
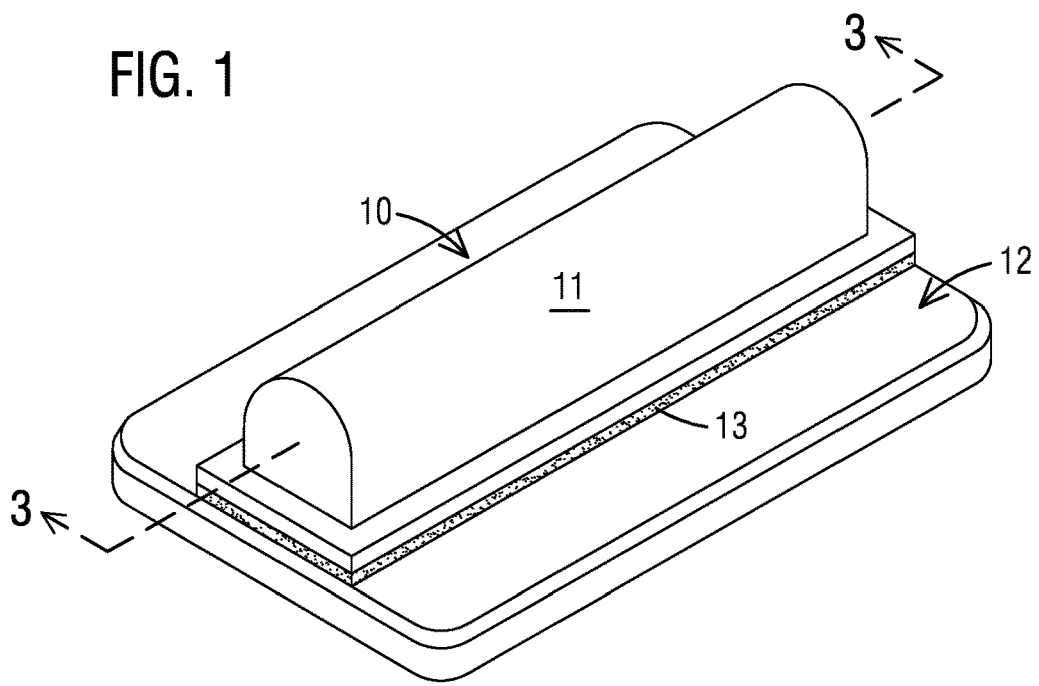
FIG. 1 is a perspective view of a mobile phone attachment attached to a mobile phone in accordance with the present invention.
Figure 2:
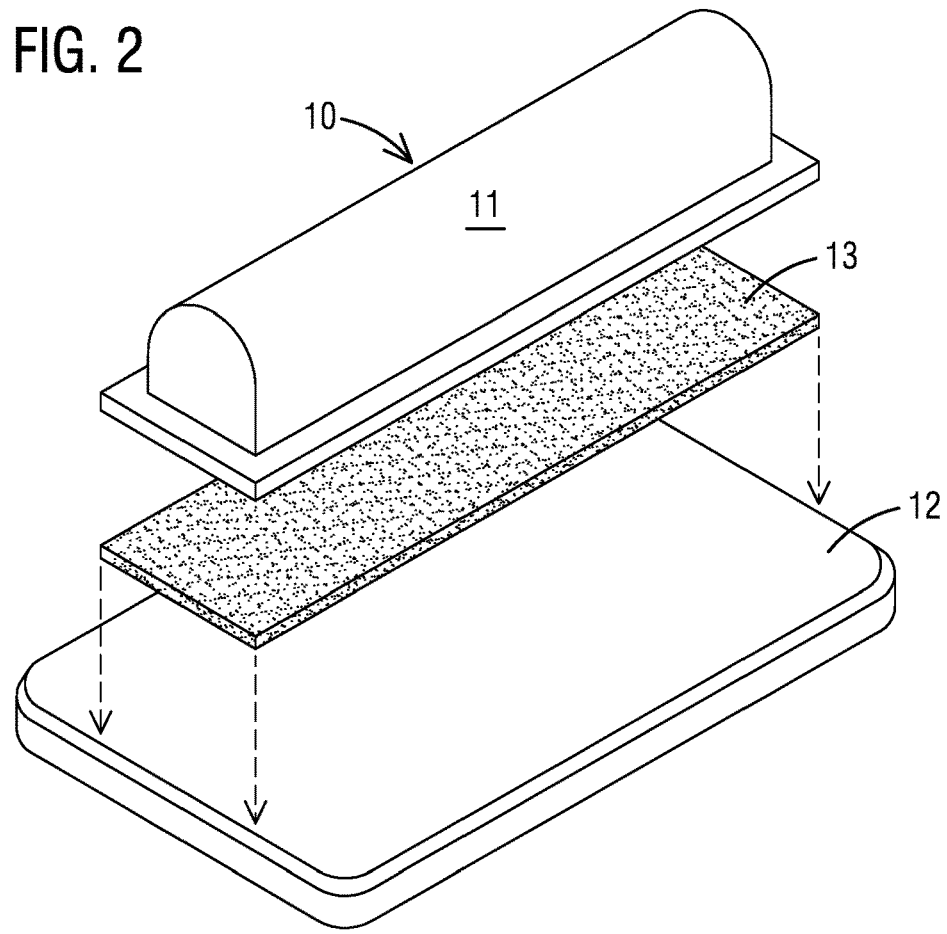
FIG. 2 is an exploded perspective view of a mobile phone and attachment of FIG. 1.

Referring to the drawings FIGS. 1 through 4 and especially to FIGS. 1 and 2, a mobile phone attachment 10 has a housing 11 and is seen attached to the back of a mobile phone 12, or the like, as seen in FIG. 1 and in an exploded view in FIG. 2, with an attachment means, such as an adhesive or hook and loop material 13.

As seen in FIG. 3, the mobile phone attachment 10 has a housing 11 closed end 14 having a biasing means, such as a coil spring 15, compressed against the closed end 14 and biasing a compressed gas cylinder 16 against a water activated trigger mechanism, such as water soluble tablet 17 which may be a salt tablet, in FIG. 3. The water soluble tablet 17 is positioned and held in the housing 11 by a trigger tablet support ledge 27 in the housing 11. The tablet support ledge 27 has an aperture 21 there through lined with a seal 28, such as an o-ring seal. A pointed punch 22 is held in the air bag chamber 18 by flanges 19 attached to the walls of the housing and positioned with the pointed end facing directly into the aperture 21 of the ledge 27. The air bag chamber 18 can be seen having a deflated air bag 23 folded inside the chamber 18 and having the air bag open end 24 attached to the outer walls of the housing 11, such as with a snap ring 8. The housing has a small aperture 26 to allow water to enter the housing 11 adjacent the soluble tablet 17. The tablet support ledge 27 aperture 21 has a seal 28 to seal the gas cylinder 16 in the aperture 21 to prevent backward gas leakage when the gas cylinder is punched open. A pop off cap 9 covers the end opening 25 and will pop off when the air bag 23 is inflated and driven from the air bag chamber 18.

When a mobile phone 12 having the attachment 10 attached thereto is dropped in water, the trigger mechanism soluble tablet ledge 17 will dissolve allowing the spring 15 to drive the compressed gas cylinder 16 through tablet support ledge aperture 21 and against the punch 22 to release the gas from the compressed gas cylinder into the air bag chamber 18 thereby inflating the air bag 23 and driving the folded air bag 23 out the open end 25 of the housing, as seen in FIG. 4. The air bag can be seen having the ends wrapped around the opening 25 and attached to the outer walls of the housing 11 with a snap ring fastener or the like 8. The air bag is held and sealed over the open end 25. A pop off top 9 covering the open end of the air bag chamber will be popped off by the inflating air bag.

In FIG. 4 the trigger mechanism soluble tablet has been dissolved to allow the spring 15 to drive the compressed gas cylinder 16 forward through the aperture 21 of the tablet support ledge 27 and against the punch 22 to release the compressed gas into the air bag chamber 18 to inflate the air bag 23 driving it from the air bag chamber 18. The inflated air bag 23 is shown in FIG. 4 pushed out of the air bag chamber 18 for floating the mobile phone to the surface of the water where it has been dropped.

FIG. 5 illustrates another embodiment of the present invention having a housing 30 having an air bag 31 chamber. The open end 32 of the air bag 33 is sealed at the housing opening 32 with a sealant or adhesive 34 so the air bag can be folded inside the housing until activated to blast out of the housing 30 opening 32. The punch 35 is attached to the inside walls of the housing 30 and aimed at an aperture 36 formed in the soluble tablet support ledge 37. A compressed gas cylinder 40 is shown already activated and pushed forward by the coil spring 41 positioned between the back wall 42 of the housing 30 and the rear of the compressed gas cylinder 40. A small aperture 43 in the housing 30 allows water to enter the housing when the mobile phone 12 is dropped into water. The opening 36 has a seal 46 therearound, such as an o-ring seal. The air bag 33 in this embodiment is stored in the chamber 31 but is blasted out of the chamber 31 to form a float to float the attached phone.

FIG. 6 illustrates another embodiment of the present invention having a housing 50 having an air bag chamber 51 therein. Open end 52 of the air bag 53 is sealed at the housing opening 54 with an air retaining ring 55 so the air bag can be folded inside the housing until activated to blast out of the housing 50 opening 54. The punch 56 is attached to the inside walls of the housing 50 and aimed at the gas cylinder 57 punchable end 58. The gas cylinder can be seen mounted in a pair of gas cylinder support structures 60 and 61 each having an o-ring seal 62 to seal the aperture in the support structures 60 and 61. These structures and seals prevent gas released from the gas cylinder 57 into the air bag chamber 51 from leaking into the spring chamber 63 in the back of the housing. The spring chamber housing 63 has a coil spring 64 positioned therein between the back wall of the housing 50 and a trigger release soluble tablet 65. The rear of the gas cylinder 57 is positioned against the soluble tablet 65 so that when the tablet is dissolved by water entering one or more apertures 66, the coil spring 64 will be released to drive the gas cylinder 57 against the punch 56. The gas cylinder 57 then releases the pressurized gas into the air bag chamber 51 to push the air bag from the chamber 51 while inflating the air bag 53 to float an attached phone dropped in a liquid.

It should be clear at this time that a mobile phone attachment for floating a mobile phone dropped in water or the like has been provided. However the present invention is not to be considered limited to the forms shown which are to be considered illustrative rather than restrictive.

I claim:

1. A mobile phone attachment comprising:
    an elongated housing for attachment to a mobile phone or the like, said elongated housing having one end portion closed and said elongated housing having a support ledge therein having an aperture therethrough supporting a water soluble member thereon;
    a biasing member positioned in said housing adjacent said closed end;
    a compressed gas cylinder positioned in said housing between said biasing member and said soluble member support ledge and said soluble member and biased against said water soluble member when said water soluble member is being held in position on said support ledge;
    an air bag chamber located in the other end portion of said housing, said air bag chamber having an opening therefrom;
    a deflated air bag being positioned in said air bag chamber;
    a pointed punch positioned in said housing facing said support ledge aperture and water soluble member supported on said support ledge and positioned for said compressed gas cylinder to be driven against said punch when said water soluble member dissolves in water to allow compressed gas to enter said air bag chamber to inflate and drive said deflated air bag from said housing with the compressed gas from said compressed gas cylinder;
    thereby inflating said air bag when said mobile phone attachment is dropped in water to float the attached mobile phone.

2. The mobile phone attachment in accordance with claim 1 in which said deflated air bag has an open end that extends out said air bag chamber opening and is attached to said housing outer wall to allow said deflated air bag to extend from and inflate when the air bag chamber is filled with compressed gas.

3. The mobile phone attachment in accordance with claim 2 in which said deflated air bag open end is attached to said housing outer wall with a snap ring fastener.

4. The mobile phone attachment in accordance with claim 1 in which said biasing member is a coil spring.

5. The mobile phone attachment in accordance with claim 1 in which said air bag chamber is covered with a pop off cap.

6. The mobile phone attachment in accordance with claim 1 in which said water soluble member is a water soluble salt tablet.

7. The mobile phone attachment in accordance with claim 1 in which said air bag has an open end attached adjacent to said air bag chamber opening to allow said deflated air bag to receive compressed gas thereinto to allow said deflated air bag to inflate and extend from said air bag chamber when said water soluble tablet dissolves and said gas cylinder is punched open to allow said compressed gas cylinder to release compressed gas into said air bag chamber.

8. The mobile phone attachment in accordance with claim 7 in which said air bag opening is adhesively attached to the open end of said air bag chamber.

9. The mobile phone attachment in accordance with claim 1 in which said elongated housing has adhesive tape thereon for attaching said mobile phone attachment to a mobile phone.

10. The mobile phone attachment in accordance with claim 1 in which said elongated housing has hook and loop material attaching said mobile phone attachment to a mobile phone having hook and loop material thereon.

11. The mobile phone attachment in accordance with claim 1 having an aperture in said housing positioned to allow water to enter for dissolving said water dissolving tablet.

12. The mobile phone attachment in accordance with claim 1 in which supporting ledge aperture has a seal therearound.

13. The mobile phone attachment in accordance with claim 12 in which supporting ledge aperture seal is an o-ring seal.

14. A mobile phone attachment comprising:

an elongated housing for attachment to a mobile phone or the like, said elongated housing having a spring chamber in one end portion thereof and an air bag chamber in the other end portion thereof and said elongated housing having at least one gas cylinder support ledge therein located between said spring chamber and said air bag chamber, each said at least one support ledge having an aperture therethrough, and said elongated housing having a soluble tablet supporting ledge therein having an aperture therethrough;

a water soluble tablet positioned on said soluble tablet supporting ledge;

a spring member positioned in said spring chamber and biased against said water soluble tablet;

a pointed punch mounted in said elongated housing air bag chamber facing at least one gas cylinder support ledge aperture;

a compressed gas cylinder mounted in said at least one gas cylinder support ledge, said compressed gas cylinder having a front end facing said pointed punch and a rear end positioned adjacent said soluble tablet;

an air bag attached to said air bag chamber and being inflatable upon said air bag chamber being filled with compressed gas from said compressed gas cylinder upon said water soluble tablet being dissolved by a liquid entering said spring chamber allowing said spring member to drive said compressed gas cylinder front end into said pointed punch;

whereby said air bag is inflated when said mobile phone attachment is dropped in water to float the attached mobile phone.

15. The mobile phone attachment in accordance with claim 14 having an aperture through said elongated housing into said air spring chamber to allow water to enter therein for dissolving said water dissolving tablet.

16. The mobile phone attachment in accordance with claim 15 in which said deflated air bag is attached inside said housing air bag chamber with a snap ring fastener.

17. The mobile phone attachment in accordance with claim 16 in which said water soluble tablet is a water soluble salt tablet.

18. The mobile phone attachment in accordance with claim 17 in which said elongated housing has two compressed gas cylinder support ledges.

* * * * *